United States Patent
Wagner et al.

(10) Patent No.: US 10,440,801 B1
(45) Date of Patent: Oct. 8, 2019

(54) MULTI-MODE OCCUPANCY SENSOR AND LIGHTING SYSTEM CONTROL

(71) Applicant: ABL IP Holding LLC, Atlanta, GA (US)

(72) Inventors: Phillip Ryan Wagner, Baltimore, OH (US); Bruce A. Bharat, Alpharetta, GA (US); Shawn L. Pleasants, Granville, OH (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/057,097

(22) Filed: Aug. 7, 2018

(51) Int. Cl.
   H05B 37/02 (2006.01)
   G01V 8/10 (2006.01)

(52) U.S. Cl.
   CPC ........... H05B 37/0227 (2013.01); G01V 8/10 (2013.01); *H05B 37/0218* (2013.01)

(58) Field of Classification Search
   CPC ................ H05B 37/02; H05B 37/0227; H05B 37/0218; H05B 33/08; H05B 37/0272; H05B 37/0245; H05B 37/034
   See application file for complete search history.

(56) References Cited

U.S. PATENT DOCUMENTS

| | | | |
|---|---|---|---|
| 5,127,575 A * | 7/1992 | Beerbaum | G05D 23/1902 165/11.1 |
| 5,344,068 A * | 9/1994 | Haessig | F24F 11/00 236/47 |
| 5,598,187 A * | 1/1997 | Ide | G06F 3/0346 345/156 |
| 8,729,446 B2 | 5/2014 | Verfuerth | |
| 9,210,759 B2 | 12/2015 | Reed | |
| 9,405,000 B2 | 8/2016 | Yeh et al. | |
| 9,433,062 B2 | 8/2016 | Reed | |
| 9,642,217 B2 | 5/2017 | Kim et al. | |
| 2010/0265100 A1 | 10/2010 | Jalbout et al. | |
| 2014/0103815 A1 | 4/2014 | Chai | |
| 2016/0081162 A1 | 3/2016 | Reed | |
| 2016/0150622 A1 | 5/2016 | Flinsenberg et al. | |
| 2016/0286627 A1 | 9/2016 | Chen et al. | |
| 2018/0220506 A1 | 8/2018 | Sadwick | |

FOREIGN PATENT DOCUMENTS

| | | |
|---|---|---|
| CN | 102123550 | 7/2011 |
| CN | 203136283 | 8/2013 |
| CN | 203301823 | 11/2013 |
| CN | 104713016 | 6/2015 |
| CN | 106793275 | 5/2017 |
| KR | 101204374 | 11/2012 |
| KR | 20130023991 | 3/2013 |
| KR | 101266279 | 5/2013 |
| KR | 20140136200 | 11/2014 |

OTHER PUBLICATIONS

U.S. Appl. No. 16/211,410, "Non-Final Office Action," dated Apr. 4, 2019, 10 pages.

\* cited by examiner

*Primary Examiner* — Thai Pham
(74) *Attorney, Agent, or Firm* — Kilpatrick Townsend & Stockton LLP

(57) ABSTRACT

A system detects multiple occupancy modes for a PIR sensor. The a single PIR motion sensor that generates a sensor output signal that is filtered or sampled to determine more than one type of motion. Upon determining the types of motion detected, the system controls a lighting system based on the type or types of motion detected.

18 Claims, 7 Drawing Sheets

MULTI-MODE OCCUPANCY SENSOR AND LIGHTING SYSTEM CONTROL

TECHNICAL FIELD

This disclosure relates generally to the field of occupancy sensing. More specifically, this disclosure relates to sensing multiple occupancy modes and controlling a lighting system based on the sensed mode.

BACKGROUND

In the field of occupancy sensing, use of passive infrared (PIR) sensors is used in many contexts. One problem with existing systems that use a single PIR sensor is that the existing solutions are only capable of sensing one type of occupancy or motion. In order to sense multiple types of occupancy or motion, these systems require multiple PIR sensors, along with additional components to support each PIR sensor. The required sensors and components increase the cost, complexity, and size of these systems.

SUMMARY

The present invention is directed to systems and methods for determining one or more occupancy modes from a single PIR sensor. An occupancy mode may be determined by the identifying types of motion. A lighting system may be controlled differently based on detection of one or more types of motion.

In one aspect of the invention, types of motion are determined by filtering or sampling an output signal from a single PIR sensor. Upon identifying one or more types of motion, an embodiment of the present invention involves controlling a light source in a particular manner based on the type of motion detected. In some aspects, the types of motion may include a human motion and a vehicle motion.

These and other aspects of the invention will be described in more detail and in the accompanying figures.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Briefly described, the present disclosure generally relates to multi-mode occupancy detection. Various aspects involves using a single PIR sensor to detect more than one type of occupancy or motion. For example, a light fixture may include a single PIR sensor and two bandpass filters. The output of the PIR sensor is provided to both bandpass filters. The first bandpass filter may be used to detect a first type of motion, such as vehicle motion, and the second bandpass filter may be used to detect a second type of motion, such as human motion. Alternatively, the output of the PIR sensor may be sampled using a first sampling rate and a second sampling rate. A single controller receives a first input indicating whether the first type of motion has been detected and a second input indicating whether the second type of motion has been detected. The controller controls a light source based on the first input, the second input, and possibly other configuration or sensor information. The controller may communicate with other controllers associated with other light fixtures and provide them with information about the type of detected motion.

Figure 1:
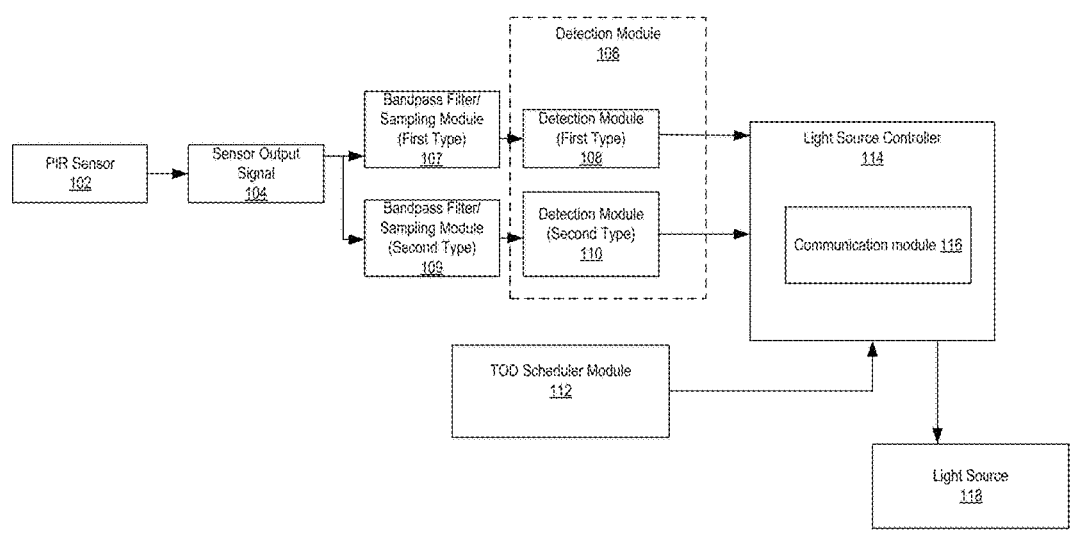
FIG. 1 depicts an example of a single sensor multi occupancy mode detection system, according to the present disclosure.

Referring now to the figures, FIG. 1 depicts an example of a multi-mode detection system, such as may be utilized by a lighting fixture. A single passive infrared (PIR) sensor 102 may detect motion and generate sensor output signal 104. For example, the PIR sensor 102 may detect a change in an amount of infrared radiation impinging on the sensor. In response to the sensor detecting a change in infrared radiation impingement, the PIR sensor 102 may generate a sensor output signal 104. The sensor output signal 104 may be a positive or negative voltage signal corresponding to the movement detected and the direction of movement. For instance, the movement detected may be indicated by a magnitude of the positive or negative voltage based on the quantity of infrared radiation (e.g., a vehicle engine has a higher magnitude voltage, a human body has a lower magnitude voltage). The direction of the detected movement may determine the positive or negative value of the sensor output signal 104. Various types of motion may result in different sensor output signals 104. For example, an object moving at a low speed may have a different sensor output signal 104 than an object moving at a high speed or one object moving at low speed may have a different sensor output signal 104 than another object moving at the same speed, but in a different direction (e.g., lateral motion relative to the sensor, motion towards or away from the sensor). In another example, different types of objects may result in different sensor output signals 104 determined by the magnitude of the infrared radiation impinged on the PIR sensor 102 (e.g. a single human, or a group of humans, a small vehicle, or a larger vehicle).

The sensor output signal 104 may be a positive or negative voltage signal. The magnitude and polarity of the signal may reflect the type of object detected, the direction of movement, and the speed of motion. For instance, the magnitude of the signal may be based on the quantity of infrared radiation detected, which is based on the type of object detected (e.g., a vehicle engine has a higher magnitude voltage, a human body has a lower magnitude voltage). The polarity of the signal may be based on the direction of the detected movement. The frequency components of the signal may be based on the speed of the detected object.

The PIR sensor 102 may provide the sensor output signal 104 to multiple bandpass filters or to multiple sampling modules. In a non-limiting example, FIG. 1 depicts a bandpass filter/sampling module (first type) 107 tuned to a first type of motion, such as vehicle motion, and a bandpass filter/sampling module (second type) 109 tuned to a second type of motion, such as human motion. Additional bandpass filter/sampling modules for additional types of motion are possible. When bandpass filters are used, the bandpass filter (first type) has a passband with a first upper limit and first lower limit and the bandpass filter (second type) has a passband with a second upper limit and second lower limit. The bandpass filters may have overlapping or non-overlapping passbands.

Each bandpass filter/sampling modules may provide a filtered/sampled output signal to an associated detection module. FIG. 1 illustrates that the output from the bandpass filter/sampling module (first type) 107 is provided to the detection module (first type) 108 and the bandpass filter/sampling module (second type) 109 is provided to the detection module (second type) 110.

Each detection module performs processing operations, which may include, but are not limited to: filtering, sampling, threshold comparison, and other analog or digital signal processing functions. More details on the operations of the different types of detection modules are discussed in relation to FIG. 2 or 3.

The outputs of the detection module indicate whether the particular detection module detected motion. In FIG. 1, the light source controller 114 receives the output of the detection module (first type) 108 and the output of the detection module (second type) 110. The controller controls light source 118 based on the outputs received from the detection module. The controller may also consider other inputs or information when controlling the light source. The light source controller 114 may receive inputs from other sensors or circuits (not shown) associated with the light fixture including, but not limited to, an ambient light sensor.

The light source controller 114 may support multiple modes of operation based on the type of motion detected. A mode of operation may specify various light attributes, such as intensity, color temperature (CT), color, a duration of illumination, or a direction of illumination. In some cases, a first mode of operation with a first set of attributes may be used when only the first type of motion is detected, a second mode of operation with a second set of attributes may be used when only the second type of motion is detected, and a third mode of operation with a third set of attributes may be used when both the first type of motion and the second type of motion are detected. In some cases, the third mode may use the maximum settings from the first mode and the second mode (e.g., the higher of the two lighting intensities, the longer of the two durations, etc.) In other cases, the third mode may contain different settings than the first mode and the second mode.

The light source controller 114 may be a single component having a processing device, a memory, input/output ports, and other elements or it may include multiple components, each component providing one or more functions. The light source controller 114 may be configured using firmware, which may be updated as needed. In some cases, the firmware may be updated by wired or wireless devices communicatively coupled to the light source controller 114.

The light source controller may include a communication module 116 or it may communicate with a communication module that is separate from the controller. The communication module may include an RF transceiver capable of communicating with other communication modules for other lighting fixtures or with a remote device. The protocols supported by the RF transceivers may include Wi-Fi®, ZigBee®, Z-Wave®, Bluetooth®, Insteon®, other protocols from the IEEE 802.11 or 802.15 family of standards, cellular communication, and/or other possible communications protocols as can be appreciated The communication module 116 may enable the controller to communicate motion detection information (e.g., detected human motion, detected vehicle motion, detected both types of motion, direction of motion, etc.) with another fixture and to receive configuration information from another device.

An example of an input to the light source controller 114 is a time-of-day (TOD) scheduler. In some cases, a TOD scheduler module 112 may be an application on a mobile device that configures the controller with TOD settings. In other cases, the TOD settings may be preset during manufacturing or configured upon installation. The TOD scheduler module 112 may configure the controller to enable one or more modes of detection at certain times of the day. It may also configure the attributes or other aspects of the modes of operation. For example, the TOD scheduler module 112 may configure the light source controller 114 to control the light source to output light at a first intensity during a first time period of a 24-hour period and to output light at a second intensity during a second time period of the 24-hour period.

In some examples, the light source controller 114 may be configured to consider additional inputs or information when controlling light source 118. It may be configured using a module similar to the TOD scheduler module. One type of input is an input from an ambient light sensor, which senses ambient lighting conditions (e.g., overcast daytime, rain, nighttime lunar illumination). The light source controller may be configured to control light source 118 differently based on different ambient lighting conditions. For example, the light source controller 114 may determine that an ambient light sensor input indicates adequate ambient light within the environment, and therefore may not cause light source 118 to illuminate in response to detected motion. An ambient light sensor input may determine an intensity of the light output by the light source for a covered parking lot, interior pathway, or a road passing through a tunnel to be a different intensity than an uncovered parking lot, uncovered footpath, or open roadway based on the detected light.

Some non-limiting examples of light source 118 include, but are not limited to a light-emitting diode (LED), a fluorescent lamp, an incandescent lamp, and/or other possible light emitting device(s). In some cases, the light source controller 114 may include a communication module 116. In other cases, the communication module 116 may be external to the light source controller 114 and communicate via input/outputs to the light source controller 114.

The description of communication between modules in FIG. 1 is illustrative and is not limiting. In some embodiments, modules may communicate using wired or wireless communication methods.

Figure 2:
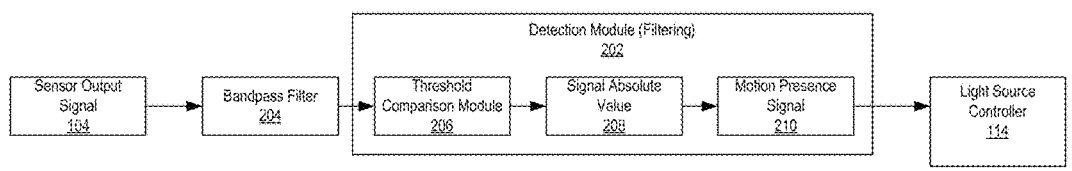
FIG. 2 depicts an example of an object detection module using a filtering configuration in a multi-mode occupancy sensor, according to the present disclosure.

FIG. 2 depicts an example of a detection module using a filtering configuration in a multi-mode occupancy sensor, such as may be a component of detection module 106, for example detection modules 108 or 110. The detection module receives a filtered output signal from the bandpass filter and determines a motion presence signal based on the tuning of the filter and detection module.

Sensor output signal 104 may be an output signal indicating motion detected by a PIR sensor, such as the PIR sensor 102 illustrated in FIG. 1. In some cases, the sensor output signal 104 has a bandpass filter 204 applied to filter a type of motion from the sensor output signal 104. The passband of the bandpass filter 204 may correspond to motion of a first type or a second type. In a non-limiting example, a bandpass filter 204 may be tuned to detect motion corresponding to an average walking speed for a human and may have a lower limit of about 0.4 Hz and an upper limit of about 5 Hz. To detect other types of motion, other passbands are used. For example, to detect a vehicle motion with a filtering configuration, the range of bandpass filter 204 would be set according to anticipated speed of the vehicle (e.g., a range in a parking lot would be different than a roadway). In some cases, the ranges for the first type of motion, the second type of motion, or additional types of motion can overlap.

The detection module (filtering) 202 may perform signal processing operations on the filtered output signal from the bandpass filter 204 to generate a motion presence signal. The threshold comparison module 206 may receive the filtered output signal from the bandpass filter 204 and may compare the filtered output signal with a threshold value. The threshold value may be preset or determined based on other factors. The threshold value may be based on the type of object that is expected to generate the motion and may differ for different types of objects and/or types of motion. When the filtered signal exceeds the threshold value, then the threshold comparison module 206 may determine that motion is detected. When the filtered signal does not exceed the threshold value, then the motion detected may be disregarded as noise.

In some examples, the threshold comparison module 206 may include additional inputs, such as an ambient light sensor, which may cause the detection module (filtering) 206 to modify the threshold value.

A signal absolute value 208 may be applied to the output of threshold comparison module 206 as a signal processing operation. For a non-limiting example, the output signal from the threshold comparison module 206 may contain both positive and negative values at varying magnitudes, which may then have signal absolute value 208 applied. In an example where the signal absolute value 208 is applied, the resulting signal magnitudes only have positive values of signal strength. The resulting output of signal absolute value 208 may be a motion presence signal 210 which indicates the presence of motion by an object (e.g., a human, a vehicle, etc.) depending on which type of object the detection module (filtering) 202 is tuned to detect. An example of a motion presence signal may be a unsigned voltage signal of a magnitude determined by the speed and intensity of the motion detected. The motion presence signal may be output to a light source controller, such as light source controller 114.

Figure 3:
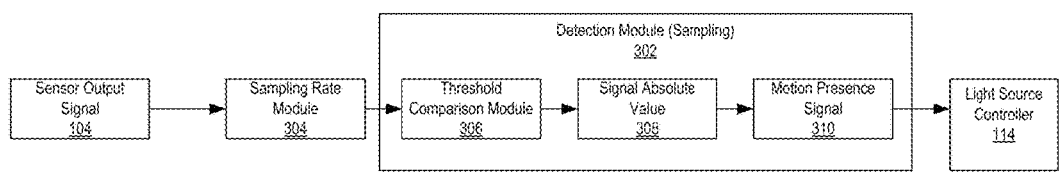
FIG. 3 depicts an example of an object detection module using a sampling configuration in a multi-mode occupancy sensor, according to the present disclosure.

FIG. 3 depicts an example of a detection module using a sampling configuration in a multi-mode occupancy sensor, such as may be a component of detection module 106, for example detection modules 108 or 110. The detection module (sampling) 302 may determine a motion presence signal from a sampled output signal received from a sampling rate module.

For example, a sampled output signal may be received by detection module (sampling) 302. A sensor output signal, such as sensor output signal 104 may be an output signal indicating motion of an object detected by the PIR sensor, such as the PIR sensor 102 illustrated in FIG. 1. In one aspect, the detection module (sampling) 302 may perform signal processing operations on the received sampled output signal to generate a motion presence signal.

For example, the sensor output signal 104 may have a sampling rate module applied to discriminate between speeds of object motion. In one aspect, the sampling rate module 304 could use a first sampling rate which corresponds to the average walking speed of a human to sample the sensor output signal 104. In another aspect, the sampling rate module 304 could use a second sampling rate to detect vehicles, such that the sampling rate would be set according to anticipated speed of the vehicle (e.g., the sampling rate for movement in a parking lot would be different than a roadway). In some cases, the sampling rates for vehicle detection and human detection can overlap.

In one aspect, the output of the sampling rate module 304 may be a sampled signal that may be received by a threshold comparison module 306 within detection module (sampling) 302. In a non-limiting example, the threshold comparison module 306 may be a comparator that compares the sampled signal with a determined threshold value, which may be a default value, or a value set by other factors. For example, when the sampled signal exceeds the threshold value, then the threshold comparison module 306 may determine that motion is detected. In another example, when the sampled signal does not meet or exceed the threshold value, then the motion detected may be disregarded as noise. In some examples, the threshold comparison module 306 may include inputs, such as an ambient light sensor, which may cause the detection module (sampled) 302 to modify the threshold value.

In some cases, a signal absolute value 308 may be applied as a signal processing operation. For a non-limiting example, the output signal of threshold comparison module 306 may contain both positive and negative signed values at varying magnitudes where the signal absolute value 308 is applied to convert the signed values into only positive values. The output of signal absolute value 308 may be a motion presence signal 310 which indicates a first type of motion or a second type of motion (e.g., a human, a vehicle, etc.) depending on which type of object the detection module (sampling) 302 is optimized to detect. An example of a motion presence signal is a unsigned voltage signal of a magnitude determined by the speed and intensity of the motion detected and may be output to a light source controller, such as light controller 114. In other cases, the motion presence signal may be a digital signal indicating a first type of motion or a second type of motion.

Figure 4:
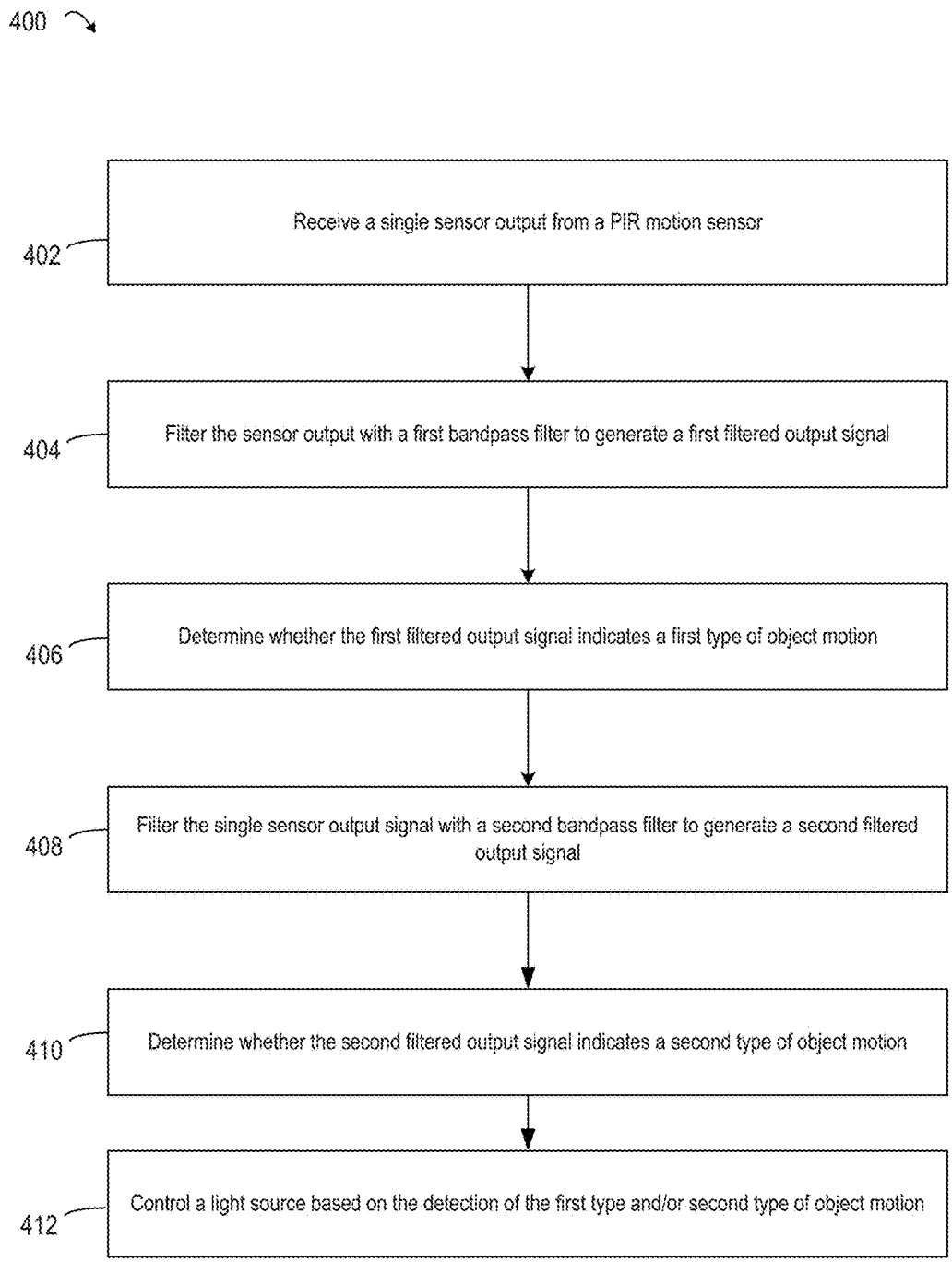
FIG. 4 depicts an example of a process for controlling a lighting fixture using a multi-mode occupancy detector in a filtering configuration, according to the present disclosure.

FIG. 4 depicts an example of a process 400 for controlling a light source based on the detection of vehicle or human motion by a PIR motion sensor using a filtering configuration. Although FIG. 4 depicts the steps in a serial arrangement, it should be appreciated that one or more blocks may be performed in a parallel arrangement. In particular, blocks 404 and 406 may be performed in parallel with blocks 408 and 410.

At block 402, the process 400 involves receiving a sensor output signal from a PIR motion sensor. An example of a sensor output signal from a PIR motion sensor may be, for example, sensor output signal 104.

At block 404, the process 400 involves filtering the sensor output signal with a first bandpass filter to generate a first filtered output signal. In one aspect, the sensor output signal may be a continuous voltage signal indicating direction and strength output by a PIR sensor. For example, the sensor output signal may be filtered by a first bandpass filter with a passband determined by the anticipated speed of vehicle motion. The passband of the first bandpass filter may depend on the location of intended use. For example, a roadway bandpass filter will have a different passband than a parking lot bandpass filter.

At block 406, the process 400 involves determining whether the first filtered output signal indicates a first type of motion. In some cases, the determination is based on comparison of the first filtered output signal with a threshold value. The threshold value may be one or more characteristics of a signal which represents the first type of motion (e.g., amplitude, frequency, etc.). The comparison of the first filtered output signal with the threshold value may be through signal processing, or logic circuits which determine if the first filtered output signal contains characteristics of the threshold value which represents the first type of motion.

At block 408, the process 400 involves filtering the sensor output signal with a second bandpass filter to generate a second filtered output signal. In one aspect, the sensor output signal may be a continuous voltage signal indicating direction and strength output by the PIR sensor. For example, the sensor output signal may be filtered by a second filter with a range determined by the anticipated speed of the human motion. In a non-limiting example, for an average human walking speed, the bandpass filter may be characterized by a lower limit of about 0.4 Hz and an upper limit of about 5 Hz.

At block 410, the process 400 involves determining whether the second filtered output signal indicates a second type of motion, for example, human motion. In some cases, the determination is based on comparison of the second filtered output signal with a threshold value. The threshold value may be one or more characteristics of a signal which represents the second type of motion (e.g., amplitude, frequency, etc.). The comparison of the second filtered output signal with the threshold value may be through signal processing, or logic circuits which determine if the second filtered output signal contains characteristics of the threshold value which represents the second type of motion.

At block 412, the process 400 involves controlling a light source based on the detection of the first type of motion and/or the second type of motion. For example, a light source, such as for example, light source 118 may have multiple settings related to intensity of illumination, direction of illumination, color of illumination, and a quantity of time for illumination. In some cases, these settings may be preset for a specific type of motion detected, or alternatively can be adjusted at each activation based on current conditions.

In a non-limiting example, various steps in the process 400 may determine that the motion detected is the first type of motion, for example, vehicle motion. Accordingly, block 412 may control the light source, such as light source 118, in a manner corresponding to the first type of motion configuration attributes. For example, the light source controller 114 may activate the light source, such as light source 118, in a uniform intensity in all directions for a quantity of time corresponding to the anticipated speed of movement or alternatively, could control the light source to illuminate a higher intensity in only the direction of movement (e.g., light illuminating the road ahead of the vehicle) and not illuminate in other directions.

In an alternative non-limiting example, various steps in the process 400 may determine that the motion detected is the second type of motion, for example, human motion. Accordingly, block 412 may control the light source in a manner corresponding to the second type of motion configuration attributes. For example, the light source controller 114 may activate the light source, such as light source 118, in a uniform first intensity in all directions for a quantity of time corresponding to the speed of movement or alternatively, could control the light source to illuminate a higher intensity in the direction of movement and a lower intensity in other directions.

In another alternative non-limiting example, various steps in the process 400 may determine that the motion detected is both of the first type of motion and the second type of motion, for example, human motion and vehicle motion. Accordingly, block 412 may control the light source in a manner corresponding to a hybrid or dominant type of configuration attributes. For example, the light source controller 114 may activate the light source, such as light source 118, in a manner that creates settings for the longest length of illumination, the highest intensity, and in all directions. In other cases, the light source controller 114 may activate the light source, such as light source 118, in a manner with settings which are a hybrid of the settings for the first type of motion and the settings for second type of motion. The light source controller 114 may also determine that the first type of motion or the second type of motion is dominant and activate the light source consistent with settings that correspond to the settings for the motion determined to be dominant (e.g., the first type of motion, the second type of motion). The light source controller 114 may also have settings which are specific for detecting both the first type of motion and the second type of motion.

Figure 5:
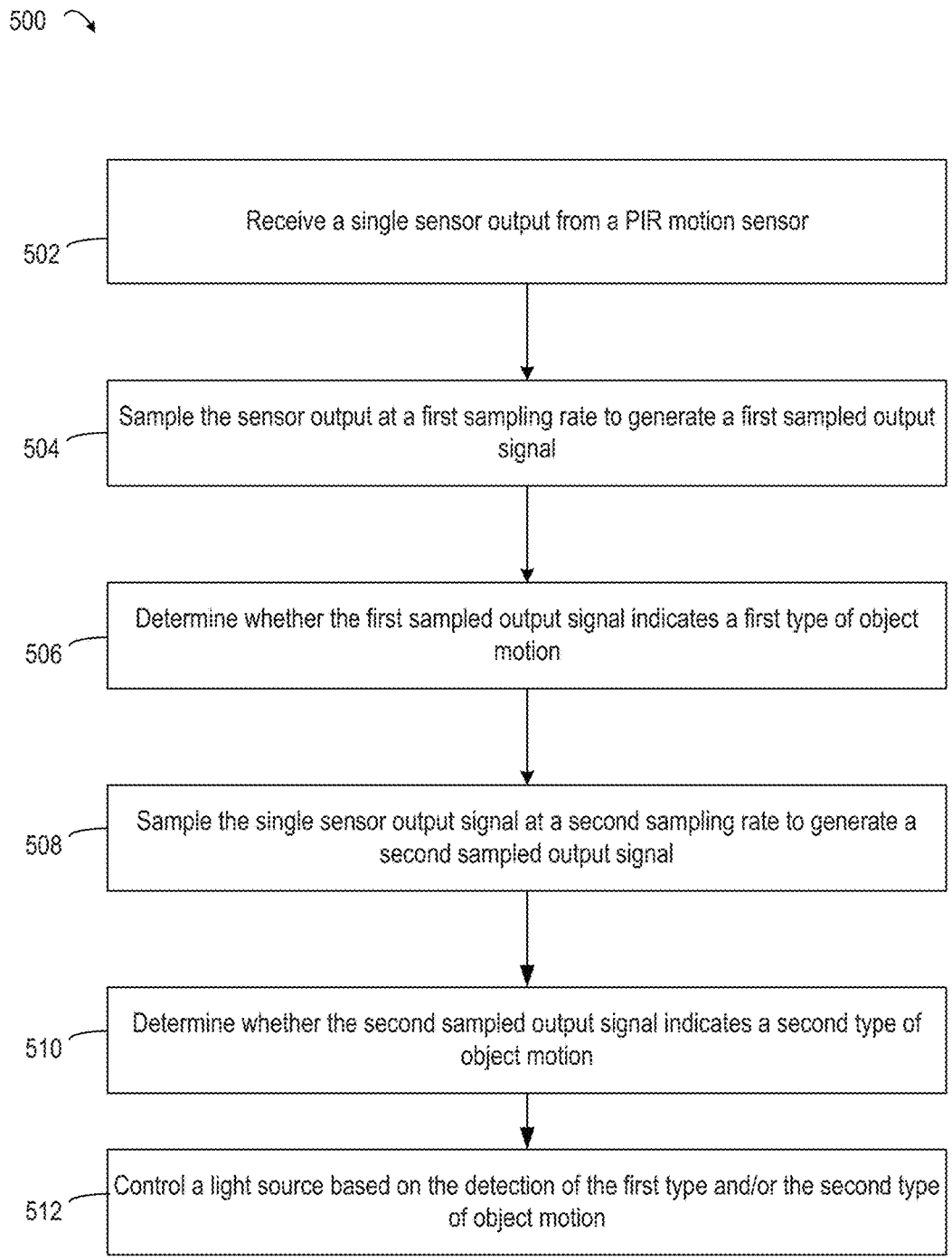
FIG. 5 depicts an example of a process for controlling a lighting fixture using a multi-mode occupancy detector in a sampling configuration, according to the present disclosure.

FIG. 5 depicts an example of a process 500 for controlling a light source based on the detection of vehicle or human motion by a PIR motion sensor using a sampling configuration. Although FIG. 5 depicts the steps in a serial arrangement, it should be appreciated that one or more blocks may be performed in a parallel arrangement. In particular, steps 504 and 506 may be performed in parallel with steps 508 and 510.

At block 502, the process 500 involves receiving a sensor output signal from a PIR motion sensor. An example of a sensor output signal from a PIR motion sensor may be, for example, sensor output signal 104. In some aspects, the sensor output signal may be received through a wired or wireless communication.

At block 504, the process 500 involves sampling the sensor output signal with a first sampling rate to generate a first sampled output signal. In one aspect, the sensor output signal may be a continuous voltage signal indicating direction and strength of a motion detector. For example, the sensor output signal may be sampled by a first sampling rate with a rate determined by the first type of motion (e.g., about the speed limit for a roadway, and an average movement speed for a parking lot). In some cases, the first sampling rate may have a different rate depending on the location of intended use. For example, the sampling rate in a roadway configuration will have a different sample rate than a sampling rate in the parking lot use configuration.

At block 506, the process 500 involves determining whether the first sampled output signal indicates the first type of motion. In some cases, the determination is based on comparison of the first sampled output signal with a threshold value which indicates definitively the first type of motion. The threshold value may be one or more characteristics of a signal which represents the first type of motion (e.g., amplitude, frequency, etc.). The comparison of the first sampled output signal with the threshold value may be through signal processing, or logic circuits which determine if the first sampled output signal contains characteristics of the threshold value which represents the first type of motion.

At block 508, the process 500 involves sampling the sensor output with a second sampling rate to generate a second sampled output signal. In one aspect, the sensor output signal may be a continuous voltage signal indicating direction and strength of a motion detector. For example, the sensor output signal may be sampled by a second sampling rate with a rate determined by the anticipated speed of the human motion.

At block 510, the process 500 involves determining whether the second sampled output signal indicates a second type of motion. In some cases, the determination may be based on a comparison of the second sampled output signal with a threshold value which indicates definitively the second type of motion. The threshold value may be one or more characteristics of a signal which represents the second type of motion (e.g., amplitude, frequency, etc.). The comparison of the second sampled output signal with the threshold value may be through signal processing, or logic circuits which determine if the second sampled output signal contains characteristics of the threshold value which represents the second type of motion.

At block 512, the process 500 involves controlling a light source based on the detection of the first type and/or second type of motion. For example, a light source may have multiple settings related to intensity of illumination, direction of illumination, color of illumination, and a quantity of time of illumination. In some cases, these settings may be preset for a specific type of motion detected, or alternatively can be customized at each activation by a light source controller, such as light source controller 114 depicted in FIG. 1.

In a non-limiting example, other steps in the process 500 may determine that the motion detected is the second type of motion. Accordingly, block 512 may control the light source in a manner corresponding to the second type of motion parameters. For example, the light source controller 114 may activate the detecting light fixture in a uniform intensity in all directions for a quantity of time corresponding to the speed of movement or alternatively, could control the light source to illuminate a higher intensity in the direction of movement.

In an alternative non-limiting example, other steps in the process 500 may determine that the motion detected is the first type of motion. Accordingly, block 512 may control the light source in a manner corresponding to the first type of motion parameters. For example, the light source controller 114 may activate the detecting light fixture in a uniform intensity in all directions for a quantity of time corresponding to the speed of movement or alternatively, could bias the light source to illuminate a higher intensity in only the direction of movement (e.g., light illuminating the road ahead of the vehicle).

In another alternative non-limiting example, various steps in the process 500 may determine that the motion detected is both of the first type of motion and the second type of motion, for example, human motion and vehicle motion. Accordingly, block 512 may control the light source in a manner corresponding to a hybrid or dominant type of configuration attributes. For example, the light source controller 114 may activate the light source, such as light source 118, in a manner that settings for the longest length of illumination, the highest intensity, and in all directions. In other cases, the light source controller 114 may activate the light source, such as light source 118, in a manner with settings which are a hybrid of the settings for the first type of motion and the settings for second type of motion. The light source controller 114 may also determine that the first type of motion or the second type of motion is dominant and activate the light source consistent with settings that correspond to the settings for the motion determined to be dominant (e.g., the first type of motion, the second type of motion). The light source controller 114 may also have settings which are specific for detecting both the first type of motion and the second type of motion.

The light source controller may communicate with light source controllers that control other fixtures so that a group of fixtures may provide a coordinated response to the detected motion. The coordinated response may activate fixtures in a detected direction of travel and/or at an expected rate of travel to illuminate the expected path of the object. The communications between light source controllers may allow a controller to illuminate a light source prior to detecting the motion of the object.

The detection module or the light source controller may determine a direction of illumination in response to inputs from the detection module(s). The light source controller may determine to illuminate only in the direction of travel, to illuminate in multiple directions at the same intensity, or to illuminate in the direction of travel at one intensity, and to illuminate in other directions at a second intensity.

Figure 6:
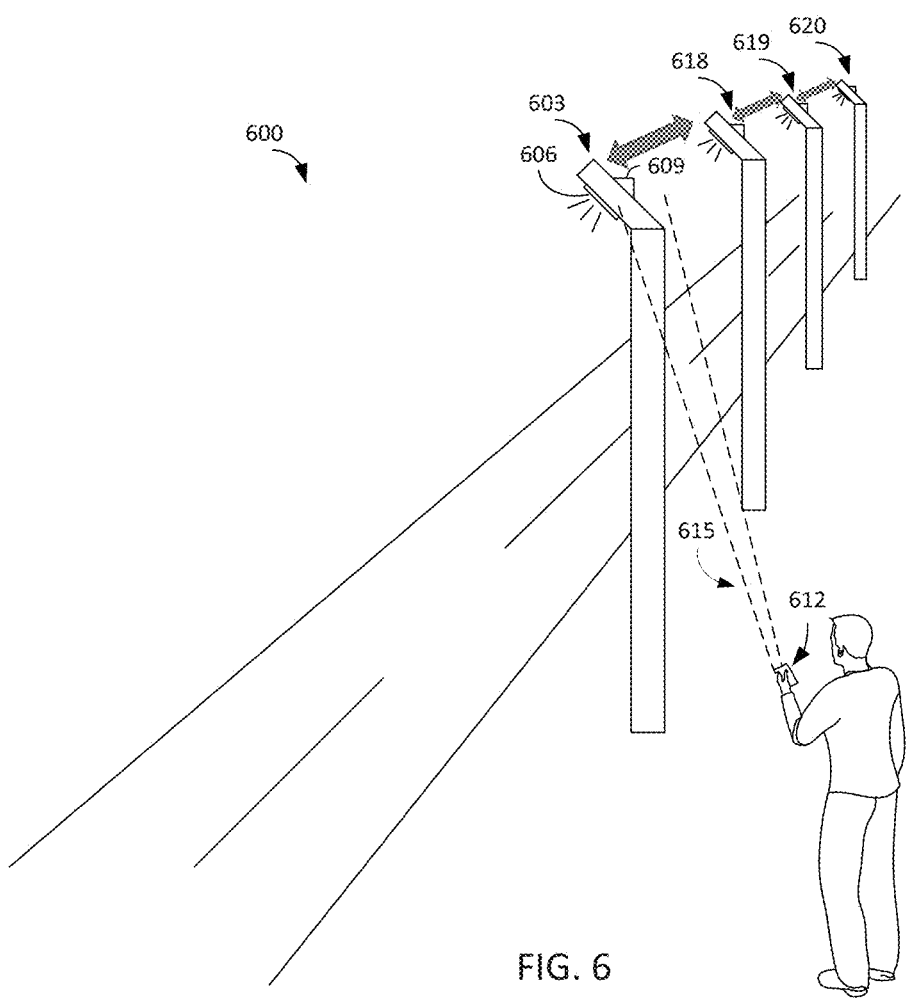
FIG. 6 illustrates an exemplary lighting environment, according to the present disclosure.

With reference to FIG. 6, shown is an exemplary lighting environment 600. The lighting environment 600 includes various lighting fixtures, including the light fixture 603, for illuminating objects in the lighting environment 600, such as a roadway. The light fixture 603 may be affixed to a structure, such as the pole shown, and may include a light source 606, a light source controller 609, and other possible components.

The light source controller 609 may include one or more RF transceivers, with which the light source controller 609 can discover other light source controllers within range of the RF transceiver and establish a network among the light source controllers. In some implementations, the light source controller 609 can identify and communicate with light source controllers that are outside the range of its RF transceiver by using other light source controllers that are within range to forward communications between them. The protocols supported by the RF transceivers may include Wi-Fi®, ZigBee®, Z-Wave®, Bluetooth®, Insteon®, other protocols from the IEEE 802.11 or 802.15 family of standards, and/or other possible communications protocols as can be appreciated.

In addition to communicating with other light source controllers, the light source controller 609 may also receive input from a remote device 612 via a wireless network interface (e.g., a Bluetooth® Low-Energy (BLE) network interface). In some implementations, the communication session may be "point-to-point," defined herein to mean a direct communication session between the remote device 612 and the light source controller 609, without the use of intermediate network devices (e.g., network routers, switches, etc.). In various implementations, the wireless network interface of the light source controller 609 is implemented as part of the RF transceiver.

The lighting environment 600 illustrates a communication scenario in which the light source controller 609 is part of a network of light source controllers, while a remote device 612 establishes a network 615 with the light source controller 609 via a wireless connection, such as a Bluetooth Low Energy (BLE) connection. After establishing a communication session over a network 615 between the remote device 612 and light source controller 609, the remote device 612 may use the communication session to send commands to modify the configuration of one or more light source controllers, individually or in groups, that may be reachable via the light source controller network accessed by the RF transceiver of the light source controller 609. The light source controller 609 may discover and communicate with other light source controllers that are reachable either directly or through one or more intermediate hops (e.g., other light source controllers).

Figure 7A:
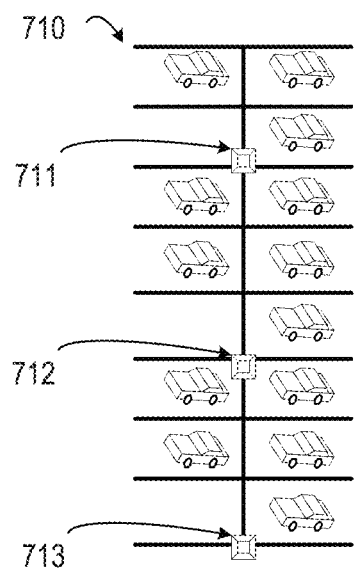
FIG. 7A-7B depict examples of implementations of a networked light fixture system, according to the present disclosure.
Figure 7B:
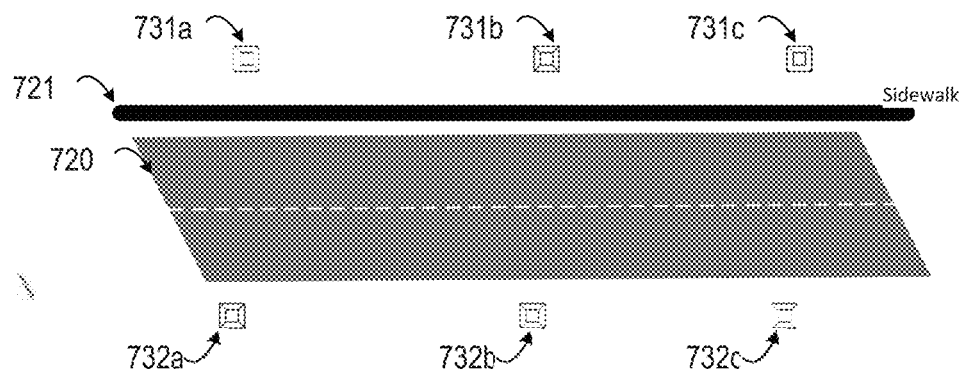

FIGS. 7A-7B depict two exemplary implementations of a lighting system, according to the present disclosure. FIG. 7A depicts an environment in which a networked lighting system is deployed in a parking lot with multiple lighting fixtures. For example, parking lot 710 may use light fixtures 711, 712, and 713 dispersed throughout the parking lot 710. In some aspects, light fixtures 711, 712, and 713 may direct light in varying or multiple intensities to the surrounding parking lot 710.

For example, lighting fixtures 711, 712, and 713 may each include a single controller wherein controller inputs may include detected motion of an object, and controller outputs may determine an intensity setting, a primary direction of illumination, or a quantity of time for illumination. In some cases, the quantity of time for illumination may be based on the detected type of motion, or alternatively may be a preset quantity of time. For a non-limiting example, a human walking through the parking lot 710 may be detected by light fixture 711 as the second type of motion. In response to the detection, the single controller of lighting fixture 711 may cause the light source of lighting fixture 711 to illuminate in a primary direction, for a quantity of time determined by settings for the type of motion. In some cases, lighting fixture 711 may communicate with lighting fixture 712, lighting fixture 713, or both, providing inputs to control activation of the respective light fixtures prior to detection of the motion by fixtures 712 or 713.

In another example, a vehicle moving through the parking lot 710 may be detected by light fixture 711. In response to the detection, lighting fixture 711 may illuminate in a primary direction, for a quantity of time determined by the type of motion. In some cases, lighting fixture 711 may communicate with lighting fixture 712 or 713 providing inputs to control activation of either light fixture 712, light fixture 713, or both, providing inputs to control activation of the respective light fixtures prior to detection of the motion by fixtures 712 or 713

FIG. 7B depicts an example of a footpath 721 primarily intended for traffic to be on foot, bike, skateboard, or similar mode of travel adjacent to a roadway 720 primarily intended for vehicle traffic, such as cars, trucks, vans, motorcycles, and other motorized powered vehicles. In some cases, the roadway 720 and footpath 721 may have multiple light fixtures 731a-c and light fixtures 732a-c.

For a non-limiting example, a vehicle (unreferenced) may be moving along roadway 720 from the vicinity of lighting fixture 731a or 732a towards lighting fixture 731c or 732c. In some cases, a vehicle moving along the roadway 720 may be detected by light fixture 731b or 732b. In response to the detection, lighting fixtures 731b, 732b, or both, may illuminate in a primary direction, for a quantity of time determined by the type of motion. In some cases, either lighting fixture 731b or 732b may communicate with lighting fixtures 731c or 732c providing inputs to control activation of the light fixtures individually or as a group, including prior to detection of an object by lighting fixtures 731c or 732c.

For another non-limiting example, a human may be moving along footpath 721 from the vicinity of lighting fixture 731a or 732a towards lighting fixture 731c or 732c. In some cases, a human moving along the footpath 721 may be detected by light fixture 731b or 732b. In response to the detection, lighting fixtures 731b, 732b, or both, may illuminate in a primary direction or all directions, for a quantity of time determined by the type of motion. In some cases, either lighting fixture 731b or 732b may communicate with lighting fixtures 731c or 732c providing inputs to control activation of the light fixtures individually or as a group, including prior to detection of an object by lighting fixtures 731c or 732c.

In some embodiments, additional information about the type of motion may be determined by one or more components described herein, for example, the speed of the motion, the type of object detected, which may be used by the light source controller to determine other groups of settings. For example, activating/deactivating the light sources based on the determined speed of the motion, such as activating/deactivating at a higher rate for faster motion.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A lighting fixture, comprising:
   a single PIR motion sensor that generates a sensor output signal;
   a first bandpass filter with a first lower limit and a first upper limit, wherein the first bandpass filter receives the sensor output signal from the single PIR motion sensor and generates a first filtered signal;
   a first detection module for receiving the first filtered signal, processing the first filtered signal to determine whether the first filtered signal indicates vehicle motion, and providing a first output signal;
   a second bandpass filter with a second lower limit and a second upper limit, wherein the second bandpass filter receives the sensor output signal from the single PIR motion sensor and generates a second filtered signal;
   a second detection module for receiving the second filtered signal, processing the second filtered signal to determine whether the second filtered signal indicates human motion, and providing a second output signal; and
   a single controller for receiving the first output signal and the second output signal and for generating a control output for controlling a light source based on the first output signal and the second output signal.

2. The lighting fixture of claim 1, wherein the first detection module and the second detection module process the sensor output signal in parallel.

3. The lighting fixture of claim 1, wherein the second upper limit of the second bandpass filter is between the first lower limit and the first upper limit of the first bandpass filter.

4. The lighting fixture of claim 3, wherein the controller generates a control output corresponding to only vehicle motion or only human motion based on relative signal strengths of the first output signal and the second output signal.

5. The lighting fixture of claim 1, wherein the single controller controls the light source via the control output to a first mode of operation having a first intensity level and a first duration when only vehicle motion is detected and to a second mode of operation having a second intensity level and a second duration when only human motion is detected.

6. The lighting fixture of claim 1, wherein the single controller is configured with time of day configuration information and uses the time of day configuration information in addition to the first output signal and the second output signal to generate the control output.

7. The lighting fixture of claim 6, wherein the time of day configuration information specifies that only vehicle motion or only human motion is used to generate the control output during a time period.

8. The lighting fixture of claim 1, further comprising:
   a communications module for communicating detected motion information to a second lighting fixture, wherein the detected motion information indicates whether the detected motion information is associated with vehicle motion or human motion.

9. A method, comprising:
   receiving a single sensor output signal from a PIR motion sensor;
   filtering the single sensor output signal with a first bandpass filter to generate a first filtered output signal, the first bandpass filter having a first lower limit and a first upper limit;
   determining whether the first filtered output signal indicates vehicle motion;
   filtering the single sensor output signal with a second bandpass filter to generate a second filtered output signal, the second bandpass filter having a second lower limit and a second upper limit;
   determining whether the second filtered output signal indicates human motion; and
   controlling a light source based on detection of vehicle motion or human motion, including controlling the light source to operate in a first mode of operation when only vehicle motion is detected and to operate in a second mode of operation when only human motion is detected.

10. The method of claim 9, wherein filtering the sensor output signal with a first bandpass filter and filtering the single sensor output signal with a second bandpass filter occur in parallel.

11. The method of claim 9, wherein the second upper limit of the second bandpass filter is between the first lower limit and the first upper limit of the first bandpass filter.

12. The method of claim 9, further comprising:
   receiving time of day configuration information, wherein controlling the light source further comprises using the time of day configuration information for controlling the light source.

13. The method of claim 9, further comprising communicating detected motion information to a second lighting fixture.

14. The method of claim 9, wherein controlling a light source comprises controlling a previously configured group of lighting fixtures, wherein each lighting fixture in the group of lighting fixtures operates in the first mode of operation when only vehicle motion is detected and operates in the second mode of operation when only human motion is detected.

15. A method, comprising:
   generating a sensor output signal from a PIR motion sensor;
   sampling the sensor output signal using a first sample rate to generate a first sampled output signal;
   determining whether the first sampled output signal indicates vehicle motion;
   sampling the sensor output signal using a second sample rate to generate a second sampled output signal, wherein the first sample rate and the second sample rate are distinct;
   determining whether the second sampled output signal indicates human motion; and
   controlling a light source based on detection of vehicle motion or human motion, including controlling the light source to operate in a first-mode of operation having a first intensity and a first duration when only vehicle motion is detected and to operate in a second mode of operation having a second intensity and a second duration when only human motion is detected.

16. The method of claim 15, further comprising:
   receiving a configuration signal, wherein the configuration signal corresponds to time of day configuration information wherein controlling the light source further comprises using the time of day configuration information for controlling the light source.

17. The method of claim 15, wherein sampling the sensor output signal using a first sample rate to generate a first sampled output signal and sampling the sensor output signal using a second sample rate to generate a second sampled output signal are performed in parallel.

18. The method of claim 15, further comprising communicating detected motion information to a second lighting fixture.

* * * * *